(12) United States Patent
Yamashita et al.

(10) Patent No.: US 12,162,520 B2
(45) Date of Patent: Dec. 10, 2024

(54) ELECTRIC VEHICLE CONTROL DEVICE, TRAIN CONTROL SYSTEM, AND GROUND DEVICE

(71) Applicant: Mitsubishi Electric Corporation, Tokyo (JP)

(72) Inventors: Yoshinori Yamashita, Tokyo (JP); Osamu Arai, Tokyo (JP); Takashi Maeda, Tokyo (JP); Tatsuro Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 219 days.

(21) Appl. No.: 17/998,846

(22) PCT Filed: May 29, 2020

(86) PCT No.: PCT/JP2020/021454
§ 371 (c)(1),
(2) Date: Nov. 15, 2022

(87) PCT Pub. No.: WO2021/240815
PCT Pub. Date: Dec. 2, 2021

(65) Prior Publication Data
US 2023/0192155 A1 Jun. 22, 2023

(51) Int. Cl.
*B61C 15/12* (2006.01)
*B60L 15/20* (2006.01)

(52) U.S. Cl.
CPC ............ *B61C 15/12* (2013.01); *B60L 15/20* (2013.01); *B60L 2200/26* (2013.01)

(58) Field of Classification Search
CPC .................................. B61C 15/12; B60L 15/20
See application file for complete search history.

(56) References Cited

U.S. PATENT DOCUMENTS 9,469,198 B2 * 10/2016 Cooper ..................... B60L 3/10
10,814,856 B2 * 10/2020 Kumar ..................... B61C 15/14
(Continued)

FOREIGN PATENT DOCUMENTS

CN 103010227 A 4/2013
EP 3505413 A1 7/2019
(Continued)

OTHER PUBLICATIONS

Office Action issued on Jan. 24, 2023, in corresponding India Patent Application No. 202227065903, with English translation. (7 pages).
(Continued)

*Primary Examiner* — Long T Tran
(74) *Attorney, Agent, or Firm* — Buchanan Ingersoll & Rooney PC

(57) ABSTRACT

An electric vehicle control device includes an idling-sliding control unit that provides control to reduce or prevent idling and sliding that may occur on a wheel of an electric vehicle. The idling-sliding control unit includes an idling-sliding detection unit for detecting idling or sliding that has occurred on the electric vehicle, and a torque command value generation unit that generates a torque command value used for reducing or preventing idling or sliding, based on output of the idling-sliding detection unit. When a prediction signal representing an anticipated occurrence of idling or sliding is inputted, the torque command value generation unit performs narrowing of the torque command value regardless of whether or not the idling-sliding control unit is performing idling-sliding control.

18 Claims, 10 Drawing Sheets

(56) References Cited

U.S. PATENT DOCUMENTS

| | | | |
|---|---|---|---|
| 2005/0189887 A1 | 9/2005 | Donnelly et al. | |
| 2007/0001629 A1* | 1/2007 | McGarry | B60L 3/10 |
| | | | 318/52 |
| 2014/0365046 A1* | 12/2014 | Madsen | B60L 15/38 |
| | | | 701/19 |
| 2017/0334414 A1* | 11/2017 | Kumar | B60T 8/175 |
| 2020/0269823 A1* | 8/2020 | Tione | B60T 13/662 |
| 2020/0369305 A1* | 11/2020 | Tione | B61L 27/04 |
| 2021/0039615 A1* | 2/2021 | Tione | B60T 8/1705 |

FOREIGN PATENT DOCUMENTS

| | | |
|---|---|---|
| JP | 2003164016 A | 6/2003 |
| JP | 2005094837 A | 4/2005 |
| JP | 2005168177 A | 6/2005 |
| JP | 2017055607 A | 3/2017 |
| JP | 2018030487 A | 3/2018 |

OTHER PUBLICATIONS

Office Action issued in corresponding Japanese Patent Application No. 2022-527467, mailed on Jan. 4, 2023, 14 pages including 7 pages of English Translation.

International Search Report (PCT/ISA/210) with translation and Written Opinion (PCT/ISA/237) mailed on Jul. 14, 2020, by the Japan Patent Office as the International Searching Authority for International Application No. PCT/JP2020/021454. (13 pages).

Mitsubishi Electric Corporation Technical Journal, "Idling Re-Adhesion Control VVVF Inverter Device" with translation, 1992 (month unknown), vol. 66, No. 4, p. 114, Mitsubishi Denki Giho. (3 pages).

* cited by examiner

ELECTRIC VEHICLE CONTROL DEVICE, TRAIN CONTROL SYSTEM, AND GROUND DEVICE

FIELD

The present disclosure relates to an electric vehicle control device that provides control to reduce or prevent idling and sliding (hereinafter referred to as "idling-sliding") of an electric vehicle driven by an electric motor, to a train control system including such an electric vehicle control device, and to a ground device that operates in conjunction with such a train control system.

BACKGROUND

In rainy weather or other similar conditions, an electric vehicle may suffer from idling-sliding due to a lower adhesion coefficient of wheels. When idling-sliding occurs on the electric vehicle, control is performed to reduce or prevent the idling-sliding. The term idling refers to a situation in which adhesion is lost when a driving force is being exerted on the wheel by an electric motor, while the term sliding refers to a situation in which adhesion is lost when a braking force is being exerted on the wheel. Idling-sliding control refers to control to normalize the situation of loss of adhesion.

Non-Patent Literature 1 listed below describes a technique relating to idling-sliding control. Specifically, the idling-sliding control described in Non-Patent Literature 1 first determines whether or not the wheel associated with each axle is in an idling state based on the velocity deviation, the reference axle velocity, the reference acceleration, and each axle acceleration. The velocity deviation is a deviation between a maximum axle velocity and a minimum axle velocity. Then, when it is determined that the wheel is in an idling state, an output electric current command value for driving an induction motor is narrowed in range thereof. Narrowing of the output electric current command value causes torque of the induction motor to be narrowed in range. This leads to re-adhesion of the wheel that is being in an idling-sliding state.

CITATION LIST

Non-Patent Literature

Non-Patent Literature 1: Mitsubishi Denki Giho (Mitsubishi Electric Corporation's Technical Journal), Vol. 66, No. 4, p. 114 (1992)

SUMMARY

Technical Problem

The conventional idling-sliding control is adapted to make operations as described above. This idling-sliding control provides improvement in re-adhesion characteristic, which provides sufficient performance and has been used on many occasions.

However, when a review is made of the operations during re-adhesion from a viewpoint of further improvement in re-adhesion characteristic, a problem is found in that the conventional idling-sliding control is performed after detection of occurrence of idling-sliding, so that a lot of time from the beginning of idling-sliding control until the halt thereof.

The present disclosure has been made in view of the foregoing circumstances, and it is an object of the present disclosure to provide an electric vehicle control device capable of shortening the time from the beginning of idling-sliding control until the halt thereof.

Solution to Problem

In order to solve the above-mentioned problems and achieve the object, the present disclosure provides an electric vehicle control device including an idling-sliding control unit to control to reduce or prevent idling and sliding to which a wheel of an electric vehicle can be subjected, wherein the idling-sliding control unit comprises: an idling-sliding detection unit to detect idling or sliding that has occurred on the electric vehicle, based on rotational velocity of one or more electric motors by which the electric vehicle is driven; and a torque command value generation unit to generate a torque command value used to reduce or prevent the idling or sliding, based on output from the idling-sliding detection unit, and when a prediction signal representing an anticipated occurrence of idling or sliding is inputted, the torque command value generation unit performs narrowing of the torque command value regardless of whether or not the idling-sliding control unit is performing idling-sliding control.

Advantageous Effects of Invention

An electric vehicle control device according to the present disclosure provides an advantageous effect that it can shorten the time from the beginning of idling-sliding control to the end thereof.

DESCRIPTION OF EMBODIMENTS

An electric vehicle control device, a train control system, and a ground device according to embodiments of the present disclosure will be described in detail below with reference to the accompanying drawings.

First Embodiment

Figure 1:
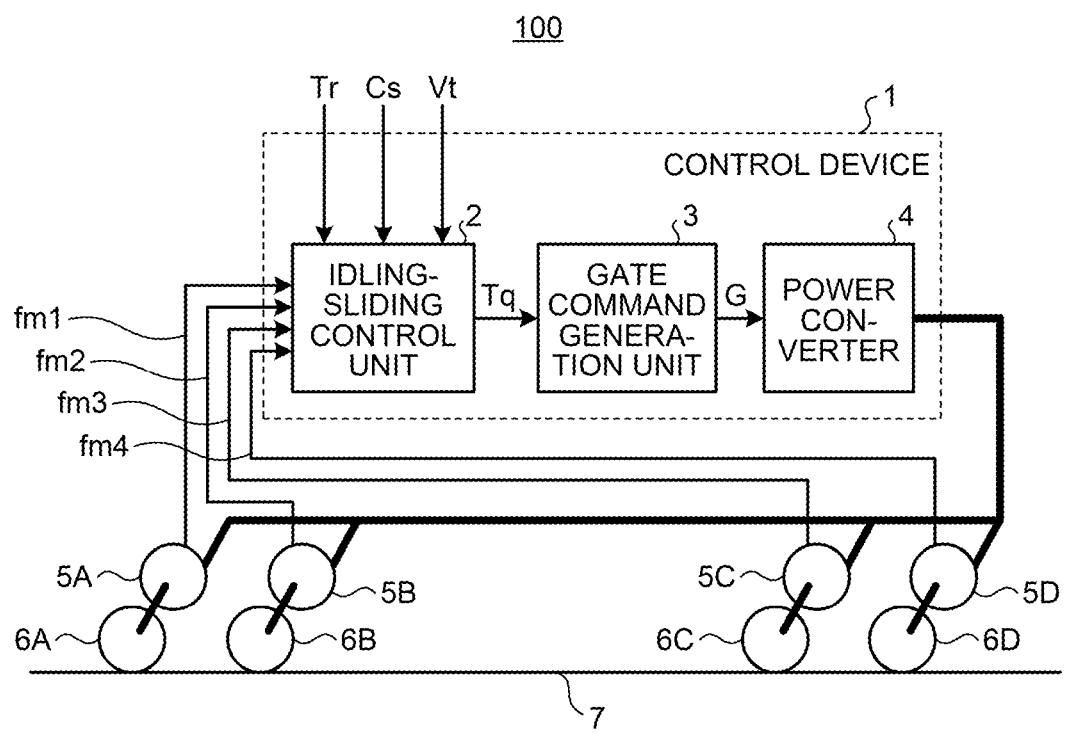
FIG. 1 is a diagram schematically illustrating a configuration of an electric vehicle including an electric vehicle control device according to a first embodiment.

FIG. 1 is a diagram schematically illustrating a configuration of an electric vehicle 100 including an electric vehicle control device (hereinafter referred to simply as "control device") 1 according to a first embodiment. In FIG. 1, the electric vehicle 100 includes four electric motors 5A to 5D for driving the electric vehicle 100. The control device 1 controls the four motors 5A to 5D. Note that FIG. 1 illustrates just a typical exemplary configuration although an alternative configuration can be adopted such that a single control device 1 controls a single motor, or another alternative configuration can be adopted such that a single control device 1 controls multiple motors when the number of motors is other than four.

The motors 5A to 5D are coupled to wheels 6A to 6D, respectively. The motor 5A drives the wheel 6A. The motor 5B drives the wheel 6B. The motor 5C drives the wheel 6C. The motor 5D drives the wheel 6D. Rotation of the wheels 6A to 6D provides the electric vehicle 100 with propulsion force based on frictional force occurring between the wheels 6A to 6D and a rail 7.

The control device 1 according to the first embodiment provides idling-sliding control that is control for reducing or preventing idling and sliding that may occur on the wheels 6A to 6D of the electric vehicle 100. In order to realize this functionality, the control device 1 includes an idling-sliding control unit 2, a gate command generation unit 3, and a power converter 4.

In FIG. 1, the idling-sliding control unit 2 receives velocity signals fm1 to fm4 that represent rotational velocities of the wheels 6A to 6D, from the wheels 6A to 6D, respectively. The idling-sliding control unit 2 provides control of torque to prevent idling-sliding of the electric vehicle 100, based on the velocity signals fm1 to fm4 received. The velocity signals fm1 to fm4 are detected on the respective wheels 6A to 6D by sensors attached to the axles (not illustrated). Note that the velocity signals fm1 to fm4 may each be obtained using a main motor velocity obtained by computation using a main motor current that is an electric current flowing through each of the motors 5A to 5D.

A configuration and an operation of a main part of idling-sliding control provided by the control device 1 will next be described. Note that the following description uses notation of "motor 5" or "motors 5" without a suffix when no distinction is made between the motors 5A to 5D, and uses notation of "wheel 6" or "wheels 6" without a suffix when no distinction is made between the wheels 6A to 6D. This manner of notation also applies to other components described below that are distinguished by a suffix. In addition, the following description is provided for a case of idling as a typical example, but description similar thereto can be presented for a case of sliding, needless to say.

The idling-sliding control unit 2 receives, as its inputs, a torque command value Tr, a prediction signal Cs, and a train velocity Vt in addition to the velocity signals fm1 to fm4. The torque command value Tr is a torque command value in a non-idling state. The prediction signal Cs is a signal representing an anticipated occurrence of idling or sliding. The prediction signal Cs is outputted when it is determined that the electric vehicle 100 is about to pass a spot where idling or sliding is more likely to occur. The train velocity Vt is information about a traveling speed of a train including the electric vehicle 100. The prediction signal Cs and the train velocity Vt are inputted from an upper level control device not illustrated in FIG. 1. Note that the prediction signal Cs and the train velocity Vt may be generated inside the control device 1 with use of at least one of an information set transmitted to the control device 1 and an information set generated or computed by the control device 1.

The idling-sliding control unit 2 computes a torque command value Tq based on the velocity signals fm1 to fm4, the torque command value Tr, the prediction signal Cs, and the train velocity Vt.

The gate command generation unit 3 receives, as its input, the torque command value Tq generated by the idling-sliding control unit 2. The gate command generation unit 3 generates a gate command G based on the torque command value Tq. The gate command generation unit 3 has a concept of including a torque computing unit, a current command value computing unit, a voltage command value computing unit, and the like. These units can be configured using a publicly known technique.

The power converter 4 is controlled based on the gate command G to generate driving power for driving the motors 5. The driving power generated by the power converter 4 is supplied to one or more of the motors 5. This causes a single motor to be driven or multiple ones of the motors 5 to be collectively driven.

Figure 2:
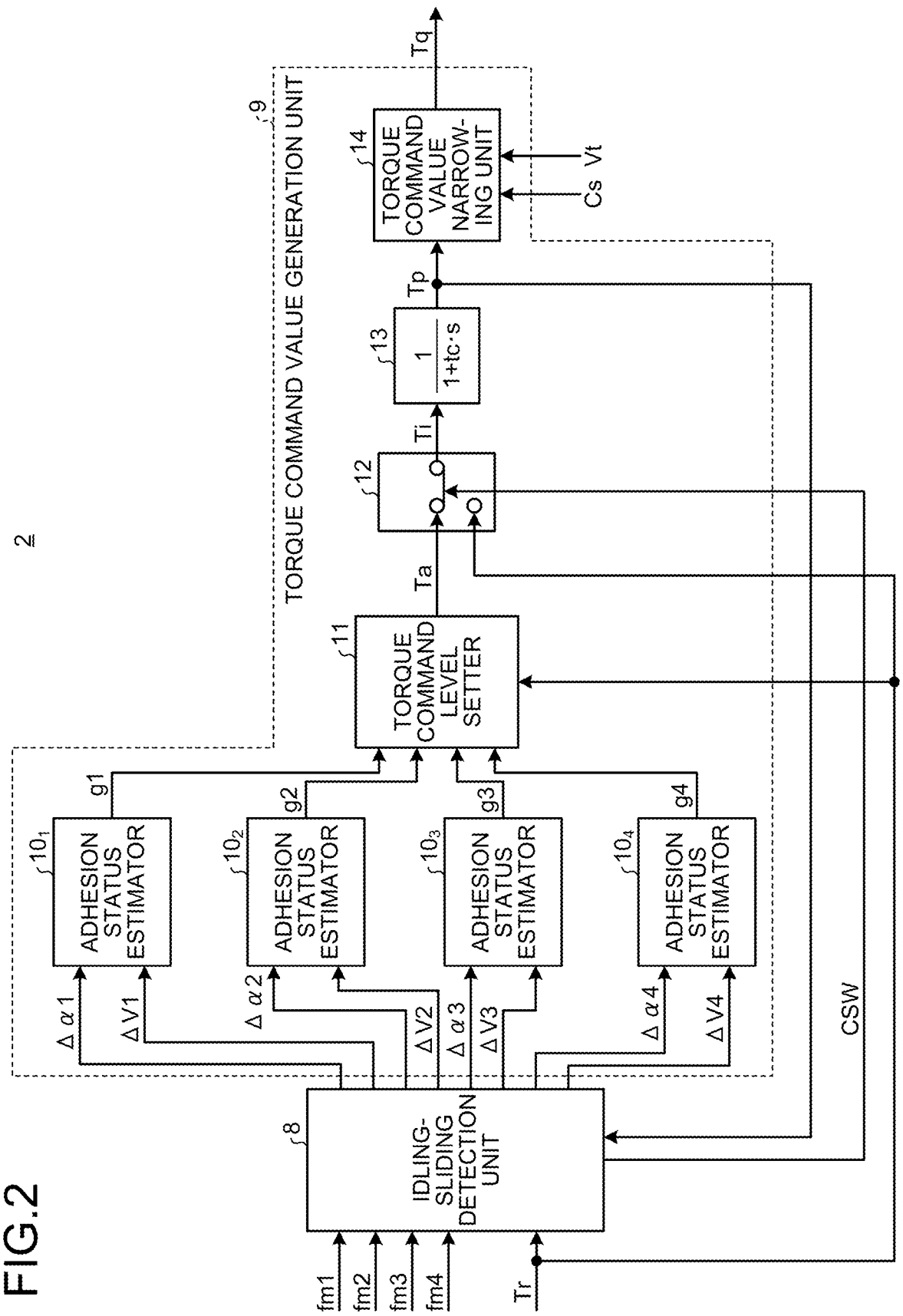
FIG. 2 is a block diagram illustrating a configuration of the idling-sliding control unit illustrated in FIG. 1.

FIG. 2 is a block diagram illustrating a configuration of the idling-sliding control unit 2 illustrated in FIG. 1. As illustrated in FIG. 2, the idling-sliding control unit 2 includes an idling-sliding detection unit 8 and a torque command value generation unit 9. The torque command value generation unit 9 includes adhesion status estimators $10_1$ to $10_4$, a torque command level setter 11, a selection switch 12, a 1st delay system 13, and a torque command value narrowing unit 14.

The idling-sliding detection unit 8 determines the adhesion status of each of the wheels 6 on the basis of the velocity signals fm1 to fm4 of the wheels 6, the torque command value Tr in a non-idling state, and a torque command value Tp (described later) generated by the 1st delay system 13.

The adhesion status estimators 10 output coefficients g1 to g4 each of which represents the adhesion status of the corresponding one of the wheels 6, based on velocity deviations $\Delta V1$ to $\Delta V4$ and acceleration deviations $\Delta\alpha 1$ to $\Delta\alpha 4$, where the velocity deviations $\Delta V1$ to $\Delta V4$ are each a deviation between the velocity of each of the wheels 6 and a reference velocity, and the acceleration deviations $\Delta\alpha 1$ to $\Delta\alpha 4$ are each a deviation between the acceleration of each of the wheels 6 and a reference acceleration. As the reference velocity, the minimum value of velocity of each of the wheels 6 is selected. The reference acceleration is an acceleration of the wheel 6 corresponding to the reference velocity. Note that as the reference velocity, vehicle velocity information transmitted from an upper level control device (not illustrated in FIG. 1) may be used.

The torque command level setter 11 computes a torque command level Ta using Equation (1) shown below based on the coefficients g1 to g4 and the torque command value Tr in a non-idling state.

$$Ta = Tr \times (g1 + g2 + g3 + g4)/4 \qquad (1)$$

The selection switch 12 selects any one of the torque command level Ta and the torque command value Tr in a non-idling state, on the basis of a control signal CSW outputted from the idling-sliding detection unit 8. The output of the selection switch 12 is inputted to the 1st delay system 13 as a torque command level Ti.

The 1st delay system 13 is a controller having a time element of a time constant tc. The 1st delay system 13 generates the torque command value Tp based on the torque command level Ti outputted from the selection switch 12. The value of the time constant tc is changed based on the torque command level Ti. A specific example is as follows. Note that it is assumed that the 1st delay system 13 is configured to enable two time constants ts and tl satisfying a relationship of ts<tl to be set therein.

The torque command value generation unit 9 compares, in magnitude, the torque command level Ti(m−1) at the time of control for the (m−1)-th time and the torque command level Ti(m) at the time of control for the m-th time. When Ti(m)<Ti(m−1), the torque command value generation unit 9 sets "ts" having a smaller value as the time constant tc. On the other hand, when Ti(m)≥Ti(m−1), the torque command value generation unit 9 sets "tl" having a larger value as the time constant tc. The time constant tc can be switched by input of the prediction signal Cs.

The torque command value rarrowing unit 14 receives, as its input, not only the torque command value Tp outputted by the 1st delay system 13, but also the prediction signal Cs and the train velocity Vt described above. The torque command value narrowing unit 14 narrows the range of the torque command value Tp while the prediction signal Cs is being inputted. The amount of narrowing in narrowing the torque command value Tp is controlled based on the train velocity Vt. The output of the torque command value narrowing unit 14 is inputted to the gate command generation unit 3 as the torque command value Tq.

Otherwise, while the prediction signal Cs is not being inputted, the torque command value narrowing unit 14 does not narrow the range of the torque command value Tp. When no narrowing action is to be performed on the torque command value Tp, the torque command value Tp generated by the 1st delay system 13 is outputted as the torque command value Tq.

Figure 3:
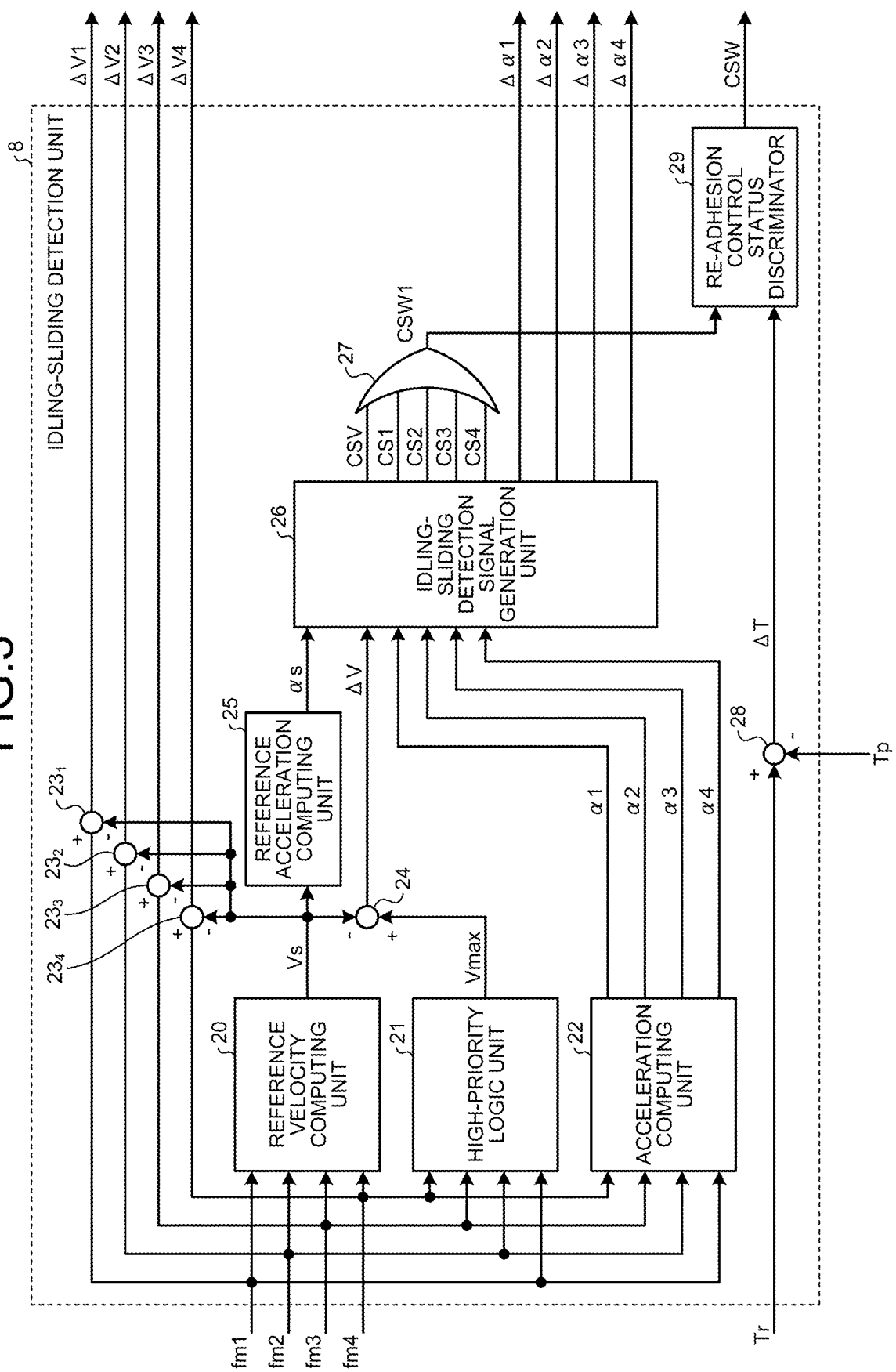
FIG. 3 is a block diagram illustrating a configuration of the idling-sliding detection unit illustrated in FIG. 2.

An operation of the idling-sliding detection unit 8 will next be described. FIG. 3 is a block diagram illustrating a configuration of the idling-sliding detection unit 8 illustrated in FIG. 2.

As illustrated in FIG. 3, the idling-sliding detection unit 8 includes a reference velocity computing unit 20, a high-priority logic unit 21, an acceleration computing unit 22, subtractors $23_1$ to $23_4$, 24, and 28, a reference acceleration computing unit 25, an idling-sliding detection signal generation unit 26, a logical OR circuit 27, and a re-adhesion control status discriminator 29.

The reference velocity computing unit 20 selects the lowest velocity from among the velocity signals fm1 to fm4, and outputs that velocity as a reference velocity Vs. Note that the reference velocity Vs may be the average value of the velocity signals fm1 to fm4, or may be vehicle velocity information transmitted from an upper level control device not illustrated.

The high-priority logic unit 21 selects the highest velocity from the velocity signals fm1 to fm4, and outputs that velocity as a maximum velocity Vmax. The acceleration computing unit 22 computes accelerations α1 to α4 of the wheels 6 based on the velocity signals fm1 to fm4. The subtractors $23_1$ to $23_4$ compute velocity deviations ΔV1 to ΔV4 between the velocities of the wheels 6 and the reference velocity Vs based on the velocity signals fm1 to fm4, respectively. The subtractor 24 computes a velocity deviation ΔV between the maximum velocity Vmax and the reference velocity Vs. The reference acceleration computing unit 25 computes a reference acceleration as based on the reference velocity Vs.

The idling-sliding detection signal generation unit 26 generates idling detection signals CSV and CS1 to CS4 and the acceleration deviations Δα1 to Δα4 based on the velocity deviation ΔV, the reference acceleration αs, and the accelerations α1 to α4, and then outputs the idling detection signals CSV and CS1 to CS4 and the acceleration deviations Δα1 to Δα4. The acceleration deviations Δα1 to Δα4 are deviations between the accelerations α1 to α4 and the reference acceleration αs, respectively. The idling detection signal CSV is a signal indicating whether or not the velocity deviation ΔV is greater than or equal to a set value. The idling detection signals CS1 to CS4 are signals indicating whether or not the acceleration deviations Δα1 to Δα4 are greater than or equal to a detection level, respectively. When the velocity deviation ΔV is greater than or equal to the set value, the idling detection signal CSV is set to a logical "1" for its signal level, and then outputted. When the acceleration deviations Δα1 to Δα4 are greater than or equal to the detection level, each of the idling detection signals CS1 to CS4 is set to a logical "1" for its signal level, and then outputted.

The idling detection signals CSV and CS1 to CS4 are inputted to the logical OR circuit 27. The logical OR circuit 27 performs a logical OR operation on the idling detection signals CSV and CS1 to CS4, and outputs the result of the operation as a control signal CSW1.

The subtractor 28 computes a torque deviation ΔT between the torque command value Tr in a non-idling state and the torque command value Tp that is a command value before the torque narrowing. The torque deviation ΔT and the control signal CSW1 outputted from the logical OR circuit 27 are inputted to the re-adhesion control status discriminator 29. The re-adhesion control status discriminator 29 generates the control signal CSW representing a re-adhesion control status, on the basis of the torque deviation ΔT and the control signal CSW1, and then outputs the control signal CSW.

Figure 4:
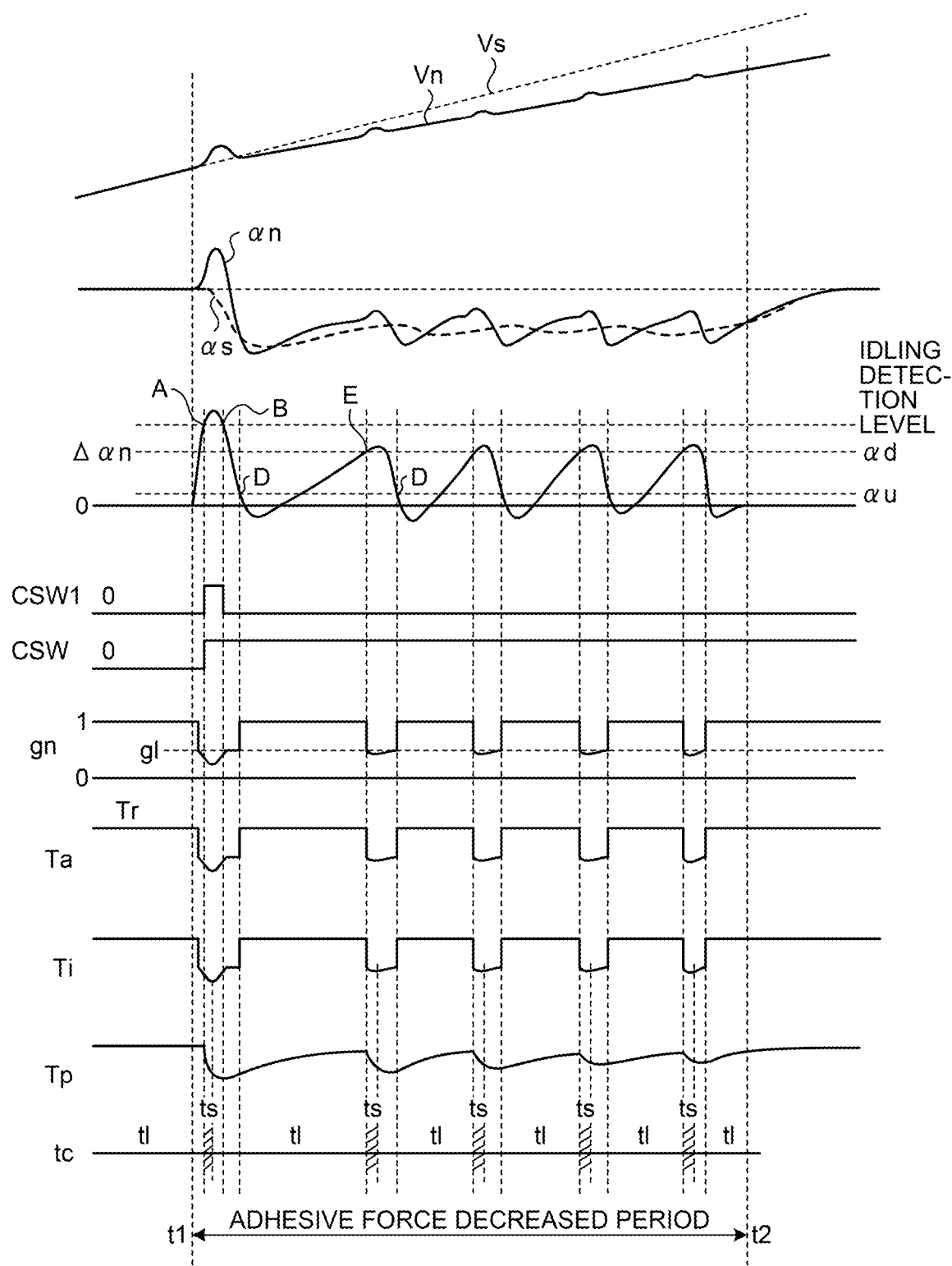
FIG. 4 is a time chart illustrating operation waveforms of a main part in re-adhesion control during idling, of the idling-sliding control unit 2 according to the first embodiment.
Figure 5:
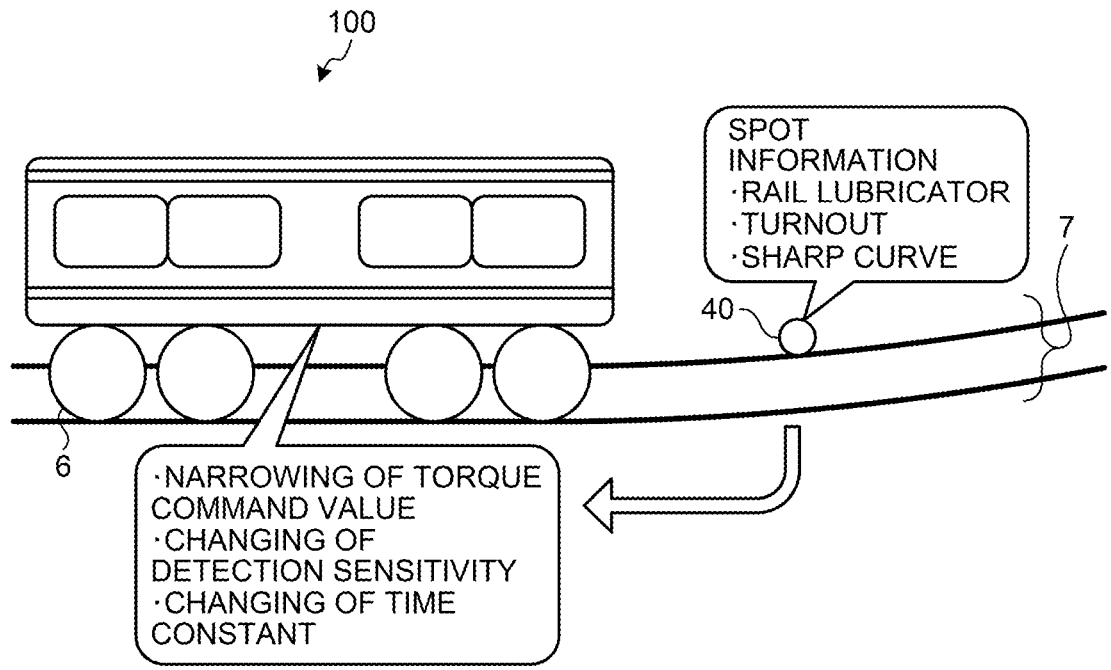
FIG. 5 is a diagram for describing an operation of a torque command value narrowing unit in the first embodiment.

An operation of the idling-sliding control unit 2 according to the first embodiment will next be described further with reference to the drawings of FIGS. 4 and 5 in addition to the drawings of FIGS. 1 to 3. FIG. 4 is a time chart illustrating operation waveforms of a main part in re-adhesion control during idling, of the idling-sliding control unit 2 according to the first embodiment. FIG. 5 is a diagram for describing an operation of the torque command value narrowing unit 14 in the first embodiment.

On a vertical axis of FIG. 4, what are represented are, sequentially from a top to a bottom of the figure, waveforms of the velocity Vn of each of the wheels 6, the acceleration αn of each of the wheels 6, the acceleration deviation Δαn, the control signals CSW1 and CSW, the coefficient gn, the torque command levels Ta and Ti, the torque command value Tp, and the time constant tc. The suffix "n" means that it refers to a component for any one wheel of the wheels 6. In addition, in the first section and the second section from the top, there are shown waveforms of the reference velocity Vs and the reference acceleration αs, respectively, by using broken lines.

Note that the operation waveforms in FIG. 4 is based on the assumption of four-axle idling. The time period from a time t1 to a time t2 is an adhesive force decreased period in which the adhesive force of each wheel has been decreased. Then, after the time t2, the adhesive force increases, thereby transiting to the operation to return to a state having appeared before occurrence of idling.

When the adhesive force decreases at the time t1, the acceleration an computed by the acceleration computing unit 22 of the idling-sliding detection unit 8 starts to increase as illustrated in FIG. 4. Then, at a point A where the acceleration deviation Δαn becomes greater than or equal to the detection level, each of the idling detection signals CS1 to CS4 become "1", and the control signal CSW1 outputted from the logical OR circuit 27 also becomes logical "1". In addition, the control signal CSW outputted from the re-adhesion control status discriminator 29 becomes "1" simultaneously with the transition of the control signal CSW1 to "1".

When idling is detected at the point A, the control signal CSW becomes "1", thereby causing the torque command level Ti that is an output of the selection switch 12, to be changed from the torque command value Tr to the torque command level Ta. In addition, the time constant tc of the 1st delay system 13 is changed from "tl" to "ts". This causes the torque command value Tp to decrease. At this time, the generated torque of the motor 5 driven by the torque command value Tp also decreases. Accordingly, the acceleration deviation Δαn also decreases, and falls below the detection level at a point B. The control signal CSW1 becomes "0" at that time.

The detection level is usually set to a value greater than "αd" for preventing a false detection. Therefore, the coefficient gn computed by the adhesion status estimator 10 increases until it becomes a set value gl that is less than 1 after the point B. On this occasion, if the coefficient gn is increasing, the torque command level Ti is also supposed to increase. In view of this, the time constant tc of the 1st delay system 13 is set to "tl". After that, the coefficient gn is maintained at the set value gl, and returns to gn=1.0 at a point D at which the acceleration deviation Δαn falls below "αu" (αu<αd). At this time, the torque command level Ti becomes equal to the torque command value Tr, thereby causing the torque command value Tp to continue to increase.

Thereafter, when the acceleration deviation Δαn reaches "αd" at a point E, the coefficient gn falls below gl, and the torque command level Ti falls below the value used at the time of the previous control. Thus, the time constant tc is set to "ts". Then, the torque command value Tp decreases, and the acceleration deviation Δαn decreases and reaches the point D, the coefficient gn returns to "1.0", and the torque command value Tp increases.

Thereafter, the foregoing detection operations at the points D and E are repeated to perform re-adhesion control until the adhesive force increases at the time t2. The time constant tc of the 1st delay system 13 is set as illustrated in the lowest stage part of FIG. 4. The increase in adhesive force at the time t2 causes the torque command value Tp to also increase, thereby causing the torque deviation ΔT computed by the subtractor 28 of the idling-sliding detection unit 8 to approach zero. In the re-adhesion control status discriminator 29, a torque deviation ΔT less than a set value causes the control signal CSW to become "0". This causes the torque command level Ti outputted from the selection switch 12 to be set to the torque command value Tr of a non-idling state.

When the torque command value narrowing unit 14 performs no operation, the torque command value Tp generated by the 1st delay system 13 is outputted from the torque command value narrowing unit 14 as is. If the corresponding description is made in an organize way, when the wheels 6 do not run idling and the prediction signal Cs is not inputted, the torque command value Tq outputted from the torque command value narrowing unit 14 becomes equal to the torque command value Tr of a non-idling state. Otherwise, when the wheels 6 run idling and the prediction signal Cs is not inputted, the torque command value Tp generated by the 1st delay system 13 from the torque command value narrowing unit 14. The value of the torque command value Tp outputted from the 1st delay system 13 is controlled to cause the acceleration deviation Δαn to vary within a range below the detection level. This can reduce a variation range of the torque command value Tp, and it can therefore be said that sufficient performance is provided in respect of the control in cases of occurrence of idling. Meanwhile, the operations performed in components from the adhesion status estimators 10 to the 1st delay system 13 in the torque command value generation unit 9 are performed after detection of idling, and so there is a problem in that a lot of time is required from the beginning of the idling control to the end thereof. To solve this problem, the torque command value narrowing unit 14 is provided.

FIG. 5 illustrates the electric vehicle 100 running along the rails 7. In addition, FIG. 5 illustrates an example in which a rail lubricator 40 is provided near an entrance toward a curve region of the rails 7.

The rail lubricator is a machine that applies oil on a rail in order to prevent abrasion of the rail. In a sharp curve section of a rail, a higher lateral pressure occurs than in a straight section thereof, causing a significantly high friction between the rail and the wheel. This friction causes abrasion of the wheel. Therefore, a rail lubricator may be installed in the sharp curve section so as to reduce friction between the wheel and the rail. Note that the term "sharp curve section" used in the present description refers to a section having a curvature of a curve greater than or equal to a specific value.

In the electric vehicle 100 according to the first embodiment, information about a location where the rail lubricator 40 is installed is stored in advance in a higher level control device as spot information. Note that the spot information may be stored inside the control device 1. Alternatively, the spot information may be stored in a monitor device or a train information management device which is mounted to the electric vehicle 100. Otherwise, the electric vehicle 100 may be configured to receive the spot information transmitted from a ground device.

In addition, although the above description has been provided for the rail lubricator 40 for an example of the spot information, the spot information is not limited to this manner. A location where a turnout or a switch is present, an entry location to a sharp curve section where the rail lubricator 40 is not installed, and/or the like may be set as the spot information.

Returning to the description with reference to FIG. 4, when the electric vehicle 100 approaches the location stored as the spot information, not only the train velocity Vt but also the prediction signal Cs is inputted to the torque command value generation unit 9. The prediction signal Cs is a signal representing an anticipated occurrence of idling or sliding. In addition, the prediction signal Cs is associated with the spot information, and is outputted before the electric vehicle passes over the spot indicated by the spot information. When the prediction signal Cs is inputted, the torque command value narrowing unit 14 narrows the torque command value Tp. As described above, the amount of narrowing in the torque command value Tp is determined based on the train velocity Vt. Note that the amount of narrowing in torque may be determined taking into consideration a control element other than the train velocity Vt. Examples of other control elements include the curvature of the rail 7, the amount of rainfall, and the amount of snowfall.

The torque command value narrowing unit 14 performs control before occurrence of idling-sliding. Therefore, it is possible to reduce or prevent an excessive narrowing in torque when idling-sliding actually occurs. This can improve ride quality of passengers riding on a train including the electric vehicle 100. In addition, the control performed by the torque command value narrowing unit 14 is control reflecting prediction of idling-sliding, thereby making it possible to minimize the number of occurrences of idling-sliding. Ability to reduce the number of occurrences of idling-sliding can reduce generation of flat on the wheels 6 and the like, and can accordingly reduce the number of times of wheel rolling and abrasing performed to remediate the flat. This enables reduction in the amount of abrasion of the wheels 6.

In addition, when the torque command value narrowing unit 14 operates to provide control, one or some of control parameters in the idling-sliding control may be modified. Examples of the modifiable control parameters include a detection level in detecting idling or sliding, and the time constant tc in the 1st delay system 13.

When the torque command value narrowing unit 14 is not included in a control system, lowering of the detection level would result in more frequent false detections, and would disturb a smooth operation of the electric vehicle 100. In this situation, in the case where the torque command value narrowing unit 14 is included in the control system, the torque command value is preliminarily narrowed when the electric vehicle enters a site where idling-sliding is more likely to occur. This can reduce or prevent an excessive narrowing in the torque command value by combination use with the control to slightly lower the detection level. This can shorten the adhesive force decreased period. Note that even control on the time constant tc in the 1st delay system 13 can provide a similar advantage.

As described above, according to the electric vehicle control device of the first embodiment, the torque command value generation unit narrows in range the torque command value regardless of whether or not the idling-sliding control unit is performing idling-sliding control when a prediction signal representing an anticipated occurrence of idling or sliding is inputted. This enables the time from the beginning of idling-sliding control until the end thereof to be shortened as compared to that in a conventional case.

Note that control to modify one or some of control parameters in the idling-sliding control may be performed in combination when the torque command value is narrowed in range. By so doing, it is possible to reduce or prevent the excessive narrowing, and at the same time, to shorten the adhesive force decreased period.

Figure 6:
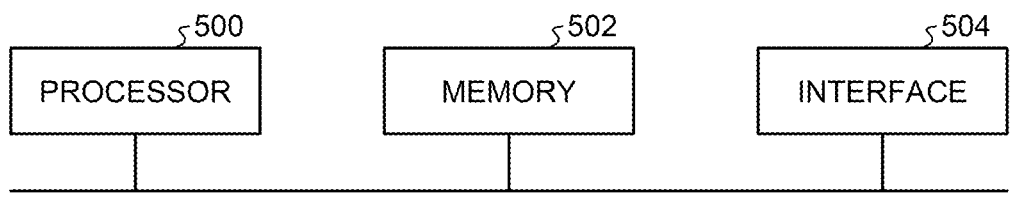
FIG. 6 is a block diagram illustrating an example of a hardware configuration for implementing functionality of the idling-sliding control unit according to the first embodiment.
Figure 7:
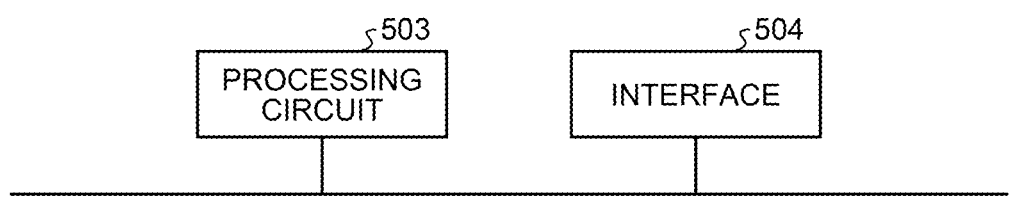
FIG. 7 is a block diagram illustrating another example of a hardware configuration for implementing functionality of the idling-sliding control unit according to the first embodiment.

A hardware configuration for implementing the functionality of the idling-sliding control unit 2 according to the first embodiment will next be described with reference to the drawings of FIGS. 6 and 7. FIG. 6 is a block diagram illustrating an example of a hardware configuration for implementing the functionality of the idling-sliding control unit 2 according to the first embodiment. FIG. 7 is a block diagram illustrating another example of a hardware configuration for implementing the functionality of the idling-sliding control unit 2 according to the first embodiment.

When part or all of the functionality of the idling-sliding control unit 2 according to the first embodiment is to be implemented, a configuration can be used, which includes, as illustrated in FIG. 6, a processor 500 adapted to perform computation, a memory 502 configured to store therein a program read by the processor 500, and an interface 504 configured to input and output signals.

The processor 500 may be a computing means such as a computing device, a microprocessor, a microcomputer, a central processing unit (CPU), or a digital signal processor (DSP). In addition, the memory 502 may be, by way of example, a non-volatile or volatile semiconductor memory such as a random access memory (RAM), a read-only memory (ROM), a flash memory, an erasable programmable ROM (EPROM), or an electrically EPROM (EEPROM) (registered trademark); a magnetic disk; a flexible disk; an optical disk; a compact disc; a MiniDisc; or a digital versatile disc (DVD).

In the memory 502, there is stored a program for carrying out functions of the idling-sliding control unit 2 according to the first embodiment. While the processor 500 transmits and receives necessary information via the interface 504, the processor 500 executes the program stored in the memory 502, and the processor 500 looks up a table stored in the memory 502, thereby making it possible to perform the processing described above. A result of computation performed by the processor 500 and the spot information can be stored in the memory 502.

In addition, when part of the functionality of the idling-sliding control unit 2 according to the first embodiment is to be implemented, a processing circuit 503 illustrated in FIG. 7 can also be used. The processing circuit 503 corresponds to a single circuit, a composite circuit, an application specific integrated circuit (ASIC), a field-programmable gate array (FPGA), or a combination thereof. Information inputted to the processing circuit 503 and information outputted from the processing circuit 503 can be acquired via the interface 504.

Note that part of the processing in the idling-sliding control unit 2 may be carried out in the processing circuit 503 while the processing not carried out in the processing circuit 503 is carried out with use of the processor 500 and the memory 502.

Second Embodiment

Figure 8:
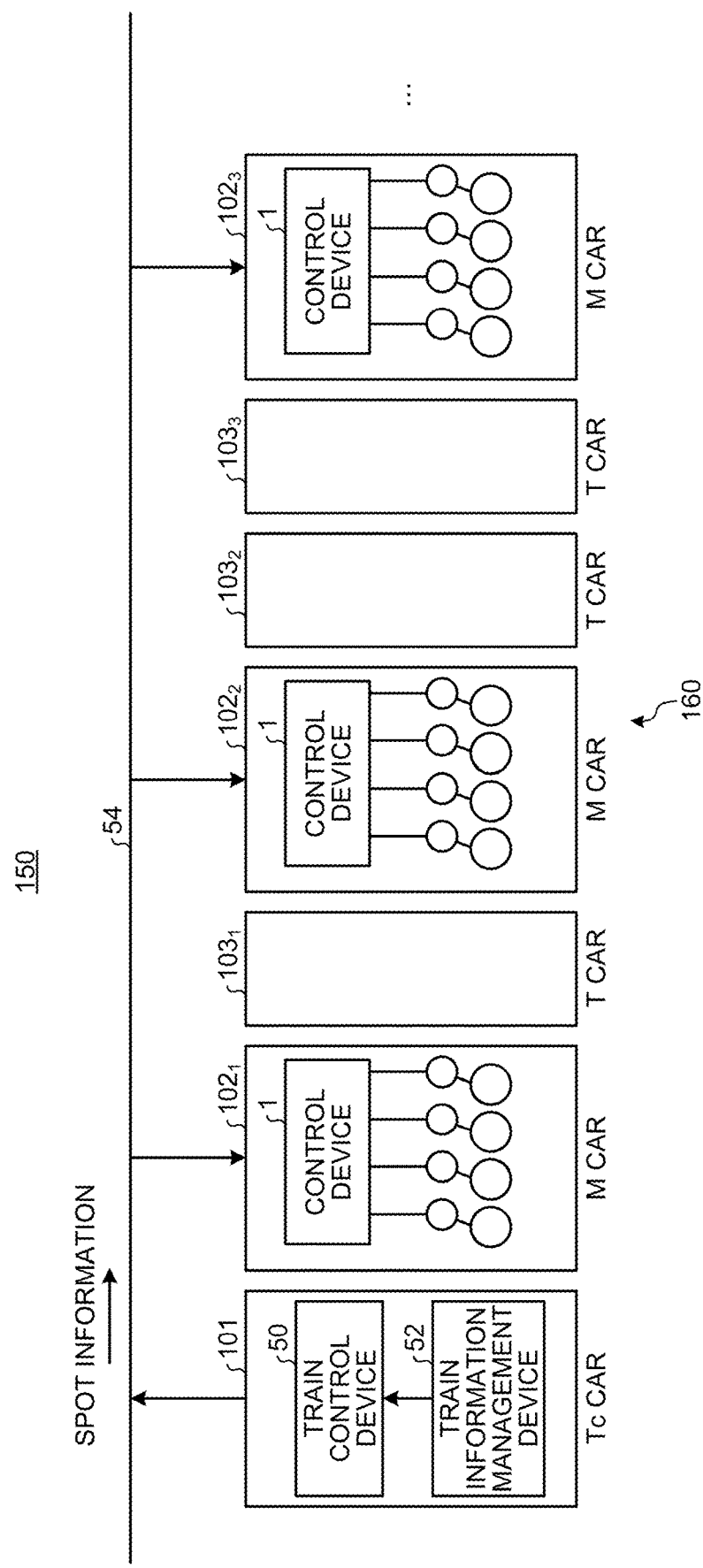
FIG. 8 is a diagram illustrating an example configuration of a train control system according to a second embodiment.

FIG. 8 is a diagram illustrating an example configuration of a train control system 150 according to a second embodiment. In FIG. 8, there is illustrated a train 160 formed to include a single control car (hereinafter denoted as "Tc car") 101, three motor cars (hereinafter denoted as "M cars") $102_1$ to $102_3$, and three trailers (hereinafter denoted as "T cars") $103_1$ to $103_3$.

The Tc car is a vehicle on which a cab (not illustrated) is mounted. The M car is a vehicle on which a motor is mounted. The T car is a vehicle on which any of a cab and a motor is not mounted. The train is supplied with propulsion force by the M cars on which motors are mounted.

The Tc car 101 includes a train control device 50 and a train information management device 52. The M cars $102_1$ to $102_3$ each include the control device 1 described in the first embodiment. That is, the control device 1 is installed in each of the M cars $102_1$ to $102_3$.

The train information management device 52 is a device configured to manage train information transmitted within the train. The train control device 50 is a device configured to generate the prediction signal Cs described in the first embodiment, and outputs the prediction signal Cs to the control devices 1. The prediction signal Cs is transmitted to the control device 1 in each of the M cars $102_1$ to $102_3$ via a transmission line 54. Note that the train control device 50 may be configured inside the train information management device 52. In this configuration, the train information management device 52 operates as a train control device 50 according to the second embodiment.

Figure 9:
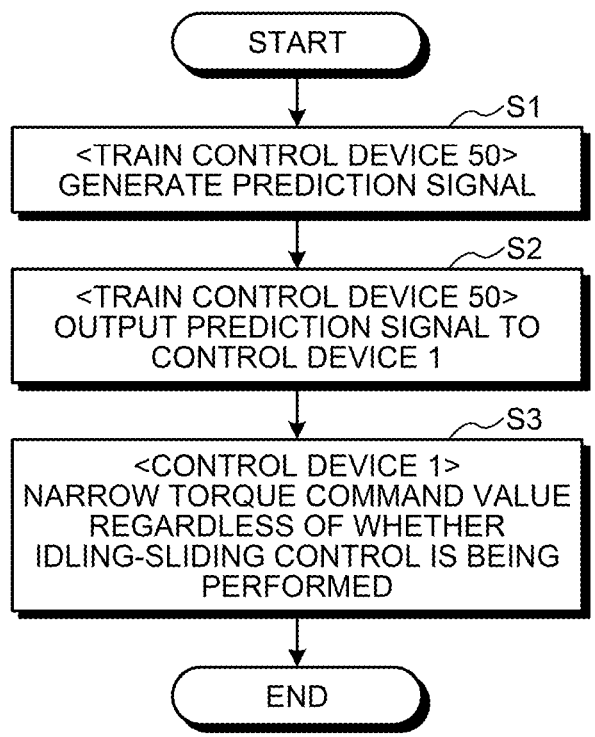
FIG. 9 is a flowchart for describing an operation of the train control system according to the second embodiment.

An operation of the train control system 150 according to the second embodiment will next be described with reference to FIGS. 8 and 9. FIG. 9 is a flowchart for describing an operation of the train control system 150 according to the second embodiment.

The train control device 50 generates the prediction signal Cs representing an anticipated occurrence of idling or sliding on the basis of the spot information (step S1). The train control device 50 outputs the generated prediction signal Cs to the control device 1 of each of the M cars $102_1$ to $102_3$ (step S2). Upon input of the prediction signal Cs, each of the control devices 1 narrows a range of the torque command value regardless of whether or not idling-sliding control is being performed in its own vehicle (step S3).

As described above, narrowing of the torque command value in the second embodiment is performed according to the prediction signal Cs from the train control device that integrated-controls the control devices. By doing so, the times of torque narrowing performed by the control devices can be synchronized with one another, and thereby making it possible to make smaller the variation in the torque command value after the narrowing. Accordingly, some influence on the ride quality of passengers riding on the train can be made smaller in addition to the advantage of the first embodiment.

Note that, similarly to the first embodiment, control to modify one or some of control parameters in the idling-sliding control may be additionally used when the torque command value is narrowed in range. This can reduce or prevent excessive narrowing in the entire train, and can thus shorten the adhesive force decreased period in the train.

Third Embodiment

The second embodiment has been described in terms of an embodiment in which the train control device 50 outputs the prediction signal generated based on the spot information, to each of the control devices 1. A third embodiment will be described in terms of an embodiment in which the foremost one of the control devices 1 in the travel direction makes a determination, and transmits the prediction signal to the following one or more of the control devices 1. Note that the train control system according to the third embodiment is configured similarly to the train control system according to the second embodiment.

Figure 10:
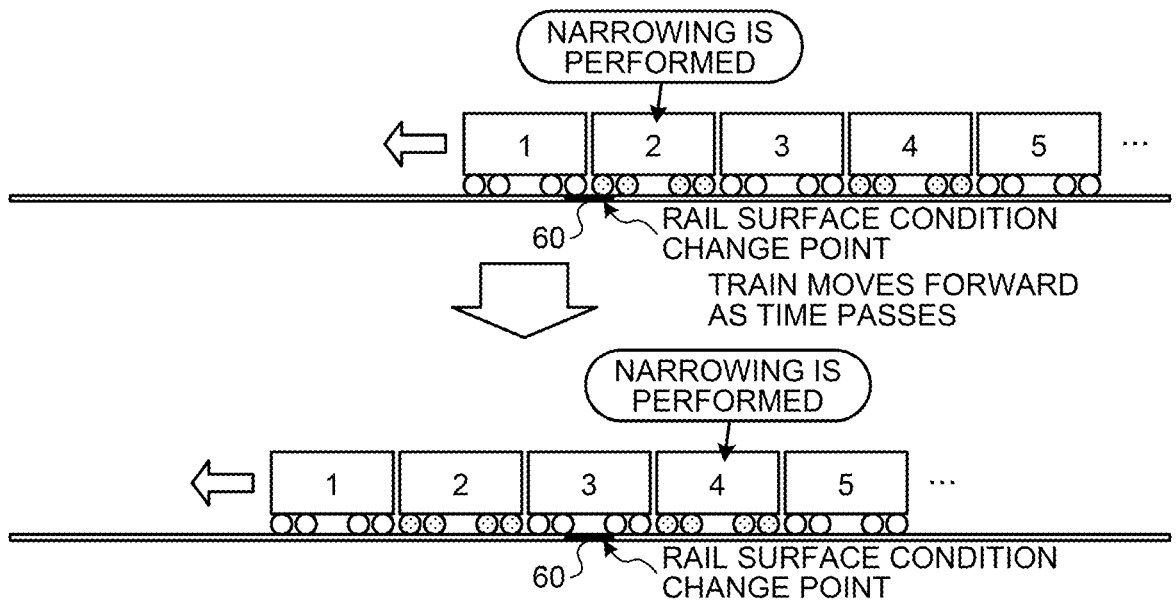
FIG. 10 is a first diagram for describing an operation of a train control system according to a third embodiment.
Figure 11:
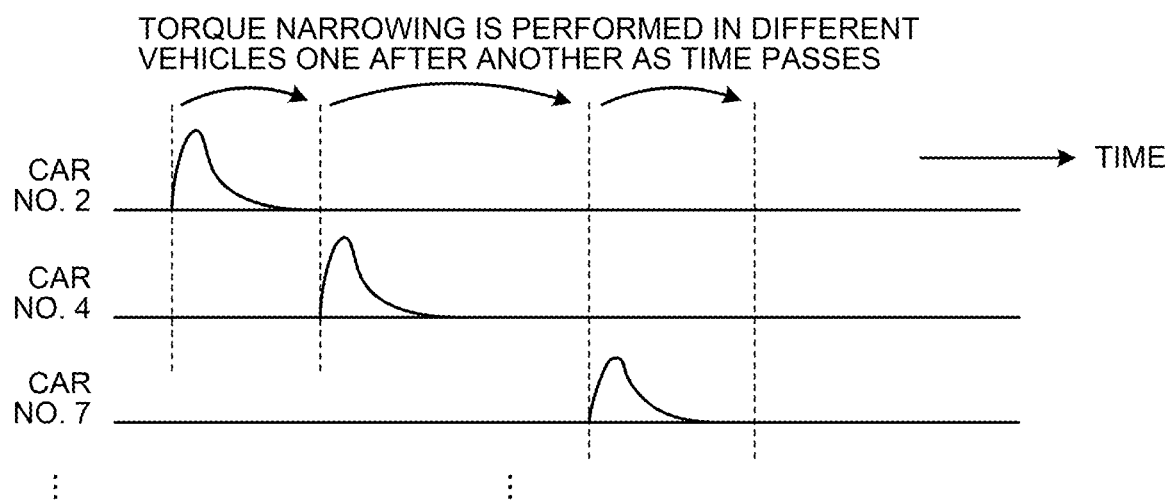
FIG. 11 is a second diagram for describing the operation of the train control system according to the third embodiment.

An operation of the train control system 150 according to the third embodiment will next be described with reference to the drawings of FIGS. 10 and 11. FIG. 10 is a first diagram for describing an operation of the train control system 150 according to the third embodiment. FIG. 11 is a second diagram for describing the operation of the train control system 150 according to the third embodiment.

FIG. 10 illustrates a situation where the train 160 illustrated in FIG. 8 runs in the left direction of the paper. In FIG. 10, the cars are, from left to right, regarded as car No. 1, car No. 2, car No. 3, car No. 4, and car No. 5, and car No. 6 and car No. 7 are omitted in illustration. In FIG. 10, car No. 2 and car No. 4 each serve as an M car on which a motor is mounted. The upper section of FIG. 10 illustrates a situation where car No. 2 of the running train 160 passes over a rail surface condition change point 60. The lower section of FIG. 10 illustrates a situation where car No. 4 of the train 160 is about to pass over the rail surface condition change point 60 as time proceeds.

The control device 1 equipped in car No. 2 detects idling-sliding when it passes over the rail surface condition change point 60. The control device 1 of car No. 2 that has detected idling-sliding performs the idling-sliding control described in the first embodiment, and generates a prediction signal to transmit the prediction signal to the subsequent one of the control devices 1. The prediction signal is transmitted with specifying a car number. Information about the positions of the M cars in a train formation is managed by the train information management device 52, and can be acquired via the train control device 50. In the case of the formation of FIG. 10, the control device 1 of car No. 2 transmits the prediction signal to the control device 1 of car No. 4.

Having received the prediction signal, the control device 1 of car No. 4 performs narrowing of the torque command value as described in the first embodiment regardless of whether or not the idling-sliding control is being performed. FIG. 11 illustrates a situation in which the torque narrowing is moved in different vehicles one after another as time passes. In the case of the formation of the train 160, torque narrowing is performed for car No. 4, and thereafter performed by the control device 1 of car No. 7.

Note that, in the foregoing example, the prediction signal is transmitted with specifying the car number, but a possible operation is not limited to that example. The prediction signal may be transmitted to all the following ones of the control devices 1 without specifying any car numbers. In the latter example case, a timing at which the torque is to be narrowed in range can be determined in each of the control devices 1 with use of information of the train velocity Vt.

As described above, according to the train control system according to the third embodiment, the control device positioned foremost in the train formation generates the prediction signal representing an anticipated occurrence of idling or sliding when idling-sliding is detected, and transmits the prediction signal to the following one or more of the control devices. The control device that has received the prediction signal performs narrowing of the torque command value regardless of whether or not the idling-sliding control is being performed. By these control processes, the narrowing of the torque command value is moved in the motor cars of the train one car after another car as time passes, so that excessive narrowing in the torque command value is avoided from a viewpoint of the entire train. This can shorten the adhesive force decreased period in the entire train. Moreover, idling-sliding control can be provided with adapting to an unpredictable change in the rail surface condition.

Fourth Embodiment

Figure 12:
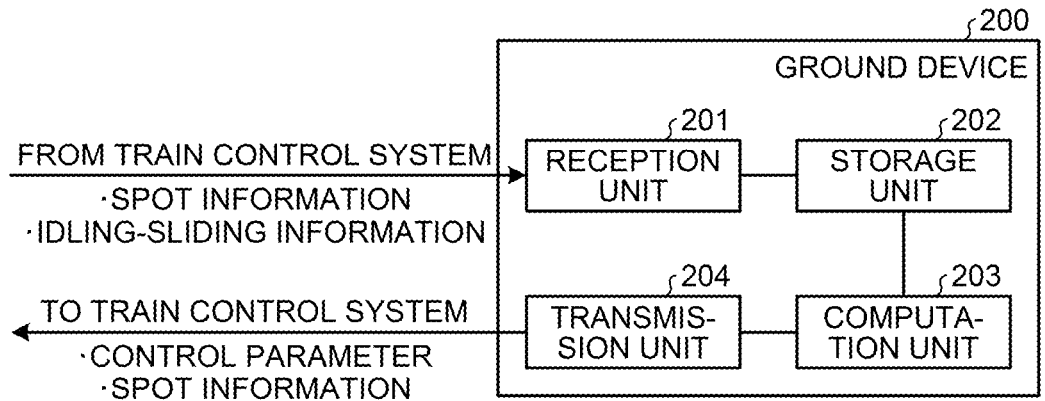
FIG. 12 is a block diagram illustrating an example configuration of a ground device according to a fourth embodiment.

A fourth embodiment will next be described for a ground device that operates in conjunction with a train control system that provides idling-sliding control. FIG. 12 is a block diagram illustrating an example configuration of a ground device 200 according to the fourth embodiment.

The description of the first embodiment has described, in which the adhesive force decreased period can be shortened by preliminary narrowing of the torque command value in advance when the vehicle enters a spot where idling-sliding is more likely to occur. The description has also described, in which combinational use of control to modify one or some of the control parameters in the idling-sliding control when the torque command value is subjected to narrowing can reduce or prevent excessive narrowing in the torque command value.

Meanwhile, the rail condition changes over time. For example, idling-sliding is more likely to occur on a rail immediately after lubrication of oil by a rail lubricator, but the rail becomes unlikely to cause idling-sliding as time passes. If the control is performed using the same parameter when idling-sliding is unlikely to occur as that used when idling-sliding is likely to occur, the torque would be narrowed in range more than necessary. Therefore, modifying the amount of torque narrowing depending on an idling-sliding level leads to a more preferred embodiment. In order to provide this functionality, the ground device 200 includes a reception unit 201, a storage unit 202, a computation unit 203, and a transmission unit 204.

Figure 13:
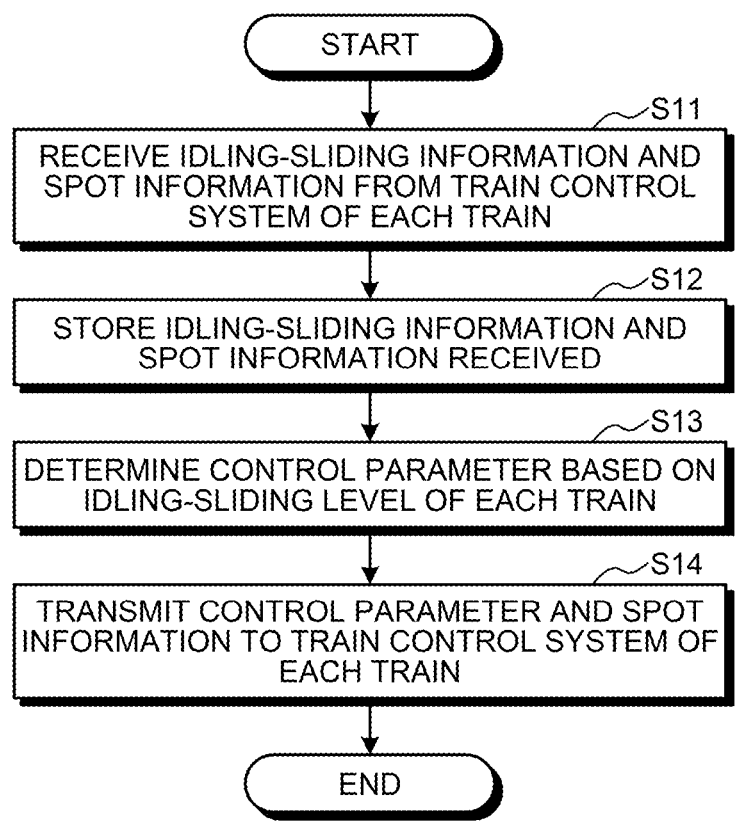
FIG. 13 is a flowchart for describing an operation of the ground device according to the fourth embodiment.

An operation of the ground device 200 according to the fourth embodiment will next be described with reference to the drawings of FIGS. 12 and 13. FIG. 13 is a flowchart for describing an operation of the ground device 200 according to the fourth embodiment. Note that an example of the train control system that operates in conjunction with the ground device 200 is assumed to be the train control system 150 illustrated in FIG. 8.

The reception unit 201 receives idling-sliding information and spot information from the train control system 150 of each train (step S11). The idling-sliding information includes an "idling-sliding level". The idling-sliding level is information about the degree of idling or sliding. The spot information is information about the spot where idling or sliding has occurred.

The storage unit 202 stores the idling-sliding information and the spot information (step S12). When the idling-sliding information is stored, the storage unit 202 associates an information set of the idling-sliding level with a spot information set, and stores these information sets for each train, that is, in association with each train. In addition, the idling-sliding level is a function of location, and is also a function of time. For example, a rail immediately after lubrication of oil by a rail lubricator has a higher idling-sliding level, and has a sliding level decreased with time. For this reason, the storage unit 202 stores the idling-sliding level as a function of time. Note that the idling-sliding level may be calculated based on a proportion of idling or sliding of a running train. Otherwise, the idling-sliding level may be calculated based on a damage level of a wheel observed in a train shed during wheel inspection.

The computation unit 203 determines a control parameter based on the idling-sliding level of each train (step S13). The control parameter said herein is the control parameter described in the first embodiment. The transmission unit 204 transmits the control parameter and the spot information to the train control system 150 of each train (step S14). The control parameter is associated with the spot information. The train control system 150 of each train controls idling-sliding of its own train on the basis of the one or more control parameters and the spot information transmitted from the ground device 200.

As described above, the ground device according to the fourth embodiment determines the control parameter for each set of the spot information in the idling-sliding control, based on the idling-sliding level and the spot information, and transmits the control parameter to the train control system of each train. In this manner, idling-sliding control is performed based on an appropriate control parameter in the train control system of each train. Therefore, each train can perform appropriate idling-sliding control, and can thus shorten the time from the beginning of idling-sliding control until the end thereof.

In addition, the ground device according to the fourth embodiment stores the idling-sliding level as a function of time. By so doing, the ground device can transmit one or more control parameters taking into consideration the likeliness of occurrence of idling-sliding, to the train control system of each train. As a result, unnecessary narrowing of torque in the train is minimized as possible, so that the adverse effect on the train operation diagram can be reduced.

Fifth Embodiment

The fourth embodiment has been described for the ground device that operates in conjunction with a train control system that provides idling-sliding control. A fifth embodiment will be described in terms of a ground device that is utilizable for development of an inspection and repair plan that is a plan for inspection or repair of a motor car.

Figure 14:
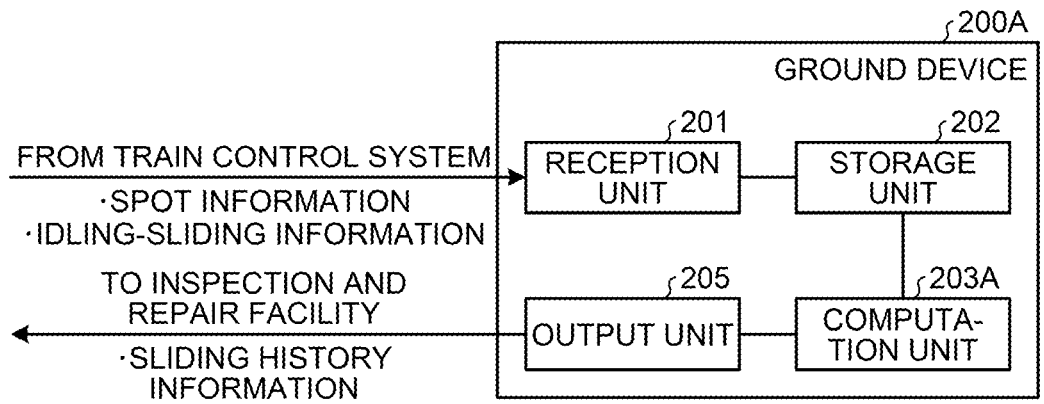
FIG. 14 is a block diagram illustrating an example configuration of a ground device according to a fifth embodiment.

FIG. 14 is a block diagram illustrating an example configuration of a ground device 200A according to the fifth embodiment. The ground device 200A includes the reception unit 201, the storage unit 202, a computation unit 203A, and an output unit 205.

Figure 15:
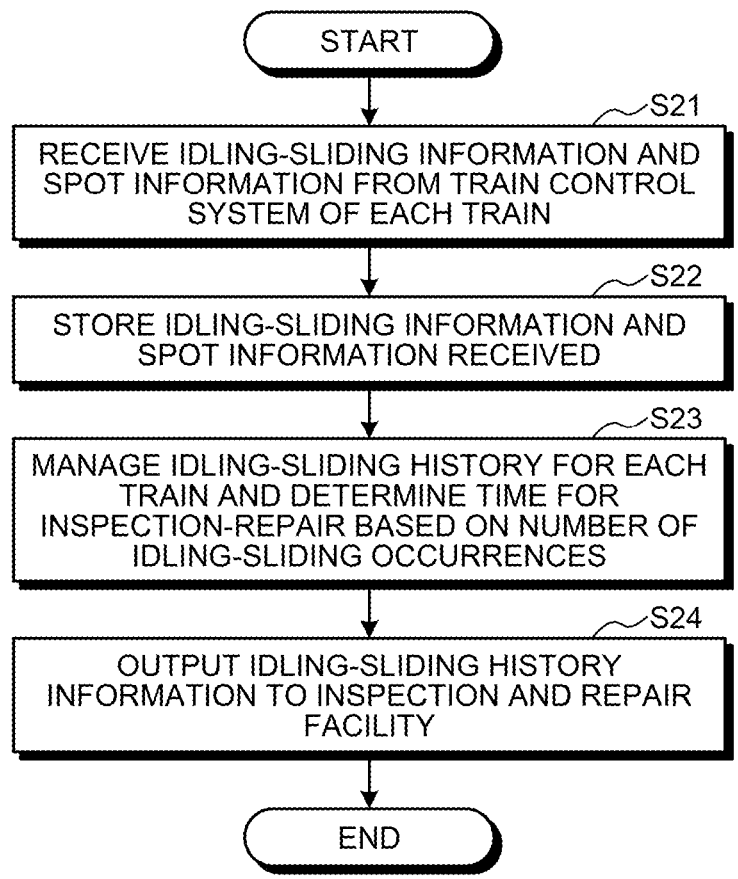
FIG. 15 is a flowchart for describing an operation of the ground device according to the fifth embodiment.

An operation of the ground device 200 according to the fifth embodiment will next be described with reference to the drawings of FIGS. 14 and 15. FIG. 15 is a flowchart for describing an operation of the ground device 200A according to the fifth embodiment. Note that an example of the train control system that operates in conjunction with the ground device 200 is assumed to be the train control system 150 illustrated in FIG. 8.

The reception unit 201 receives idling-sliding information and spot information from the train control system 150 of each train (step S21). The idling-sliding information includes the number of idling-sliding occurrences that is the number of occurrences of idling-sliding, and an idling-sliding level corresponding to the degree of idling or sliding. The spot information is information about the spot where idling or sliding has occurred. Note that the idling-sliding level may be calculated based on a proportion of idling or sliding of a running train. Otherwise, the idling-sliding level may be calculated based on a damage level of a wheel observed in a train shed during inspection of the wheel.

The storage unit 202 stores the idling-sliding information and the spot information (step S22). When the idling-sliding information is stored, the storage unit 202 associates an information set of the number of idling-sliding occurrences and an information set of the idling-sliding level with a spot information set, and stores these information sets for each train, that is, in association with each train.

The computation unit 203A manages an idling-sliding history for each train, and determines a time for inspection and repair, on the basis of the number of idling-sliding occurrences (step S23). The output unit 205 outputs idling-sliding history information to an inspection and repair facility (step S24). The inspection and repair facility is a facility in which work for inspection and repair of a train is performed.

A supplementary description will next be given for how to determine the time for inspection and repair. The ground device 200A counts the number of idling-sliding occurrences during a certain time period, and manages the counting result as an idling-sliding history. For example, when the number of idling-sliding occurrences is a number of times less than or equal to a threshold, a responsive action can be taken to exclude the wheel of the motor car from regular inspection items in the next time. In addition, the time for the next inspection can be determined depending on the number of idling-sliding occurrences. For example, an action can be taken such that an inspection is performed one month later if the number of idling-sliding occurrences is 5, and an inspection is performed two months later if the number of idling-sliding occurrences is 3.

As described above, the ground device according to the fifth embodiment determines and outputs the time for inspection and repair of a wheel of the motor car on the basis of the number of idling-sliding occurrences. This can contribute to development of an inspection and repair plan for wheels of the motor cars. Each train is subjected to some inspection and/or repair work using an inspection and repair plan developed utilizing the ground device, thereby enabling a reduction in the number of times of repair of the wheel and in the number of times of replacement of the wheels. This can improve efficiency, save manpower, and save labor in inspection and repair operation.

The configurations described in the foregoing embodiments are just examples, each of which can be combined with other publicly known techniques, and can be partially omitted and/or modified without departing from the scope of the present disclosure.

REFERENCE SIGNS LIST

1 control device; 2 idling-sliding control unit; 3 gate command generation unit; 4 power converter; 5, 5A-5D electric motor; 6, 6A-6D wheel; 7 rail; 8 idling-sliding detection unit; 9 torque command value generation unit; 10, $10_1$-$10_4$ adhesion status estimator; 11 torque command level setter; 12 selection switch; 13 1st delay system; 14 torque command value narrowing unit; 20 reference velocity computing unit; 21 high-priority logic unit; 22 acceleration computing unit; $23_1$-$23_4$, 24, 28 subtractor; 25 reference acceleration computing unit; 26 idling-sliding detection signal generation unit; 27 logical OR circuit; 29 re-adhesion control status discriminator; 40 rail lubricator; 50 train control device; 52 train information management device; 54 transmission line; 60 rail surface condition change point; 100 electric vehicle; 101 control car (Tc car); $102_1$-$102_3$ motor car (M car); $103_1$-$103_3$ trailer (T car); 150 train control system; 160 train; 200, 200A ground device; 201 reception unit; 202 storage unit; 203, 203A computation unit; 204 transmission unit; 205 output unit; 500 processor; 502 memory; 503 processing circuit; 504 interface.

The invention claimed is:

1. An electric vehicle control device including an idling-sliding control unit to control to reduce or prevent idling and sliding to which a wheel of an electric vehicle can be subjected, wherein
the idling-sliding control unit comprises:
an idling-sliding detection unit to detect idling or sliding that has occurred on the electric vehicle, based on rotational velocity of one or more electric motors by which the electric vehicle is driven; and
a torque command value generation unit to generate a torque command value used to reduce or prevent the idling or sliding, based on output from the idling-sliding detection unit, and
when a prediction signal representing an anticipated occurrence of idling or sliding is inputted, the torque command value generation unit performs narrowing of the torque command value regardless of whether or not the idling-sliding control unit is performing idling-sliding control.

2. The electric vehicle control device according to claim 1, wherein
the prediction signal is associated with spot information, and
narrowing of the torque command value is performed before a spot represented in the spot information is passed.

3. The electric vehicle control device according to claim 2, wherein
the spot information includes information about a location where a rail lubricator or turnout is provided or information about an entry location to a curve having a curvature greater than or equal to a specific value.

4. The electric vehicle control device according to claim 3, wherein
the idling-sliding control unit modifies one or some of control parameters in the idling-sliding control when narrowing of the torque command value is performed.

5. The electric vehicle control device according to claim 4, wherein
the control parameter to be modified is a detection level in detection of idling or sliding.

6. The electric vehicle control device according to claim 4, wherein
the control parameter to be modified is a time constant in performing narrowing of the torque command value.

7. The electric vehicle control device according to claim 2, wherein
the idling-sliding control unit modifies one or some of control parameters in the idling-sliding control when narrowing of the torque command value is performed.

8. The electric vehicle control device according to claim 7, wherein
the control parameter to be modified is a detection level in detection of idling or sliding.

9. The electric vehicle control device according to claim 7, wherein
the control parameter to be modified is a time constant in performing narrowing of the torque command value.

10. The electric vehicle control device according to claim 1, wherein
the idling-sliding control unit modifies one or some of control parameters in the idling-sliding control when narrowing of the torque command value is performed.

11. The electric vehicle control device according to claim 10, wherein
the control parameter to be modified is a detection level in detection of idling or sliding.

12. The electric vehicle control device according to claim 10, wherein
the control parameter to be modified is a time constant in performing narrowing of the torque command value.

13. A train control system to perform idling-sliding control to reduce or prevent idling and sliding to which a train formed to include a plurality of motor cars by which propulsion force is applied can be subjected, the train control system comprising:
- a plurality of control devices installed on the respective motor cars to each detect idling or sliding that has occurred on the motor car, and provide idling-sliding control on the motor car; and
- a train control device to generate a prediction signal representing an anticipated occurrence of idling or sliding, and output the prediction signal to the control devices, wherein
- when the prediction signal is inputted, each of the control devices performs narrowing of a torque command value regardless of whether or not the idling-sliding control is being performed.

14. The train control system according to claim 13, wherein
- the prediction signal is associated with spot information, and
- narrowing of the torque command value is performed before a spot represented by the spot information is passed.

15. A train control system to perform idling-sliding control to reduce or prevent idling and sliding to which a train formed to include a plurality of motor cars can be subjected, the train control system comprising:
- a plurality of control devices installed on the respective motor cars to each detect idling or sliding that has occurred on the motor car, and provide idling-sliding control of the motor car; and
- a train control device to transmit location information of the motor cars in a formation of the train, to the control devices, wherein
- when idling or sliding is detected, a foremost one of the control devices in the formation generates a prediction signal representing an anticipated occurrence of idling or sliding, and transmits the prediction signal to a following one of the control devices, and
- the control device that has received the prediction signal performs narrowing of a torque command value regardless of whether or not the idling-sliding control is being performed.

16. A ground device to operate in conjunction with a train control system to provide idling-sliding control to reduce or prevent idling and sliding to which a train formed to include a plurality of motor cars can be subjected, the ground device comprising:
- a reception unit to receive, from the train control system, an idling-sliding level and spot information, the idling-sliding level being information about a degree of idling or sliding that has occurred on the train, the spot information being information about a spot where the idling or sliding has occurred;
- a storage unit to store the idling-sliding level and the spot information received, in association with each other;
- a computation unit to determine a control parameter for each set of the spot information in the idling-sliding control, based on information stored in the storage unit; and
- a transmission unit to transmit the control parameter associated with the spot information to the train control system.

17. The ground device according to claim 16, wherein
the spot information includes information about a location where a rail lubricator or turnout is provided or information about an entry location to a curve having a curvature greater than or equal to a specific value.

18. A ground device to operate in conjunction with a train control system to perform idling-sliding control to reduce or prevent idling and sliding to which a train formed to include a plurality of motor cars can be subjected, the ground device comprising:
- a reception unit to receive a number of idling-sliding occurrences from the train control system, the number of idling-sliding occurrences being information about the number of times of idling and sliding that has occurred on the train;
- a storage unit to store the number of idling-sliding occurrences received;
- a computation unit to determine a time for inspection and repair of a wheel of the motor car, based on information stored in the storage unit; and
- an output unit to output idling-sliding history information including information about the time for inspection and repair.

* * * * *